May 14, 1935. O. WEIGNER ET AL 2,001,231
APPARATUS FOR AUTOMATIC ELECTRIC ARC WELDING
Filed Feb. 28, 1934 2 Sheets-Sheet 2
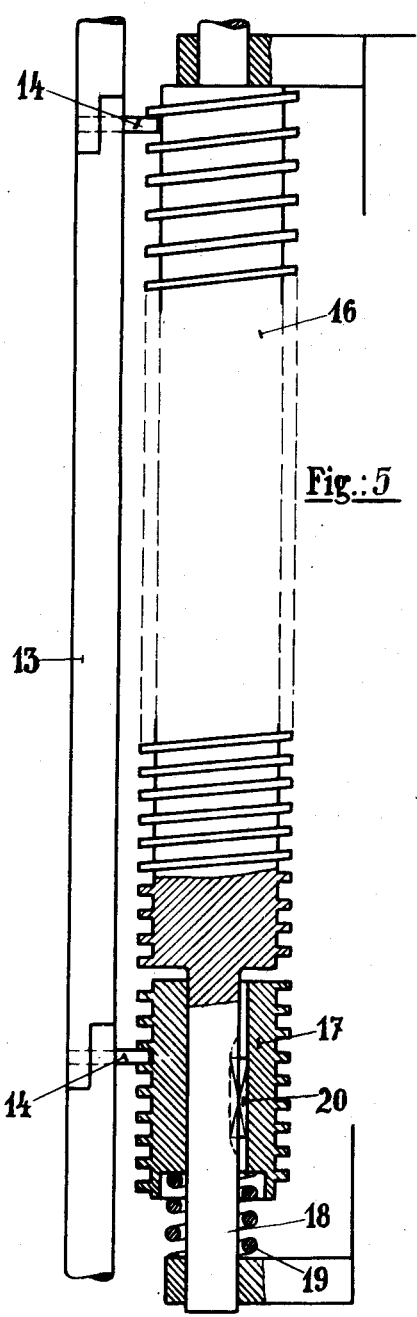
Fig.:5
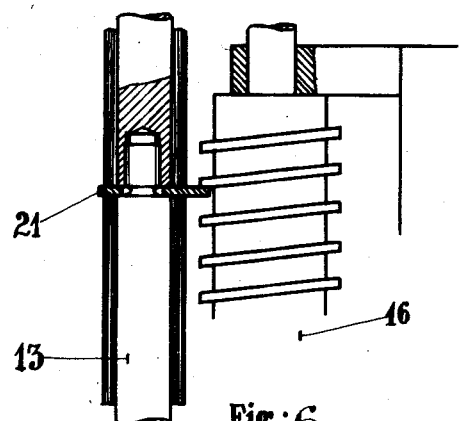
Fig.:6
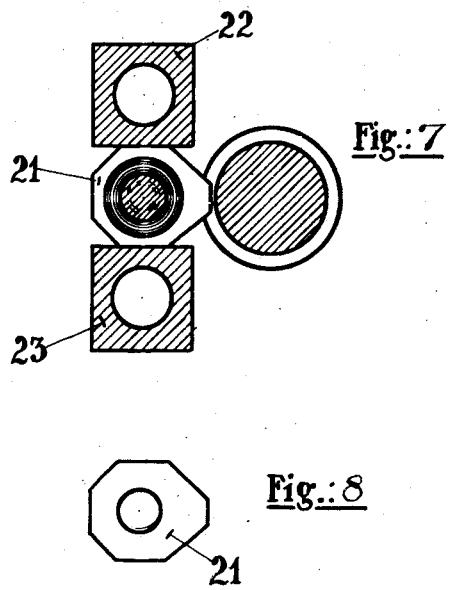
Fig.:7
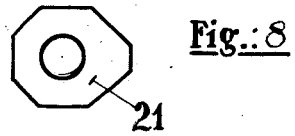
Fig.:8
O. Weigner & W. Senft
INVENTORS
By: Mairs & Clark
Attys.

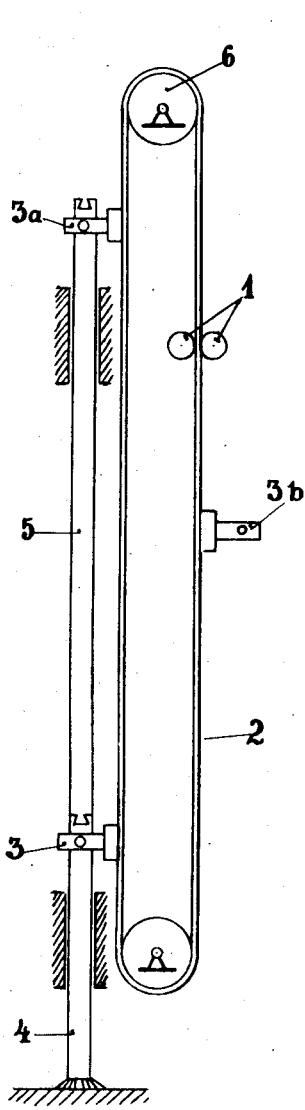
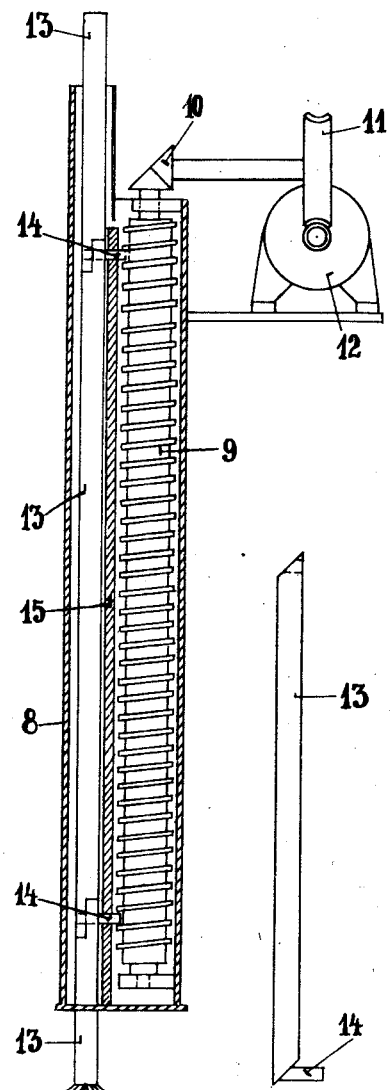
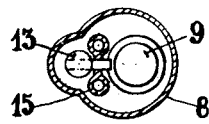

Patented May 14, 1935

2,001,231

UNITED STATES PATENT OFFICE 2,001,231

APPARATUS FOR AUTOMATIC ELECTRIC ARC WELDING

Otto Weigner, Vienna, and Willibald Senft, Weiz, Styria, Austria, assignors to "Elin" Aktiengesellschaft für Elektrische Industrie, Vienna, Austria Application February 28, 1934, Serial No. 713,386
In Germany March 4, 1933

8 Claims. (Cl. 219—8)

This invention relates to an improved method of and apparatus for automatic electric arc welding. When it is necessary, in automatic electric arc welding, to weld with sheathed electrodes, these latter are employed in comparatively short lengths which are left uncovered at the upper end, in order to permit of the supplying of the welding current thereto. After the consumption of an electrode rod of this type the remnant is taken out and the next rod inserted in the feed device. This procedure implies the interruption of the arc each time, which has a detrimental effect upon the quality of the welding and also leads to loss of time.

In the case of bare uncovered rod electrodes the attempt has already been made to overcome this drawback by making the ends of the rods suitable for interlocking, by screwing or otherwise, so that the rods can be strung together. To permit of using the same method with sheathed electrodes in which the current supply is checked by the sheathing, the expedient has been proposed of embedding wires in the sheathing to conduct the welding current to the core of the electrode. Such electrodes, however, are expensive to manufacture, and the thin auxiliary wires in the sheathing are subjected to an extremely high current density, and are apt to part in the arc.

It has also been proposed to attach electrodes singly to a traveling endless belt propelled by the feed motor, and in this manner to enable a fresh electrode to be inserted without interrupting the arc. The belt is in this case current-conducting, so that the welding current can be supplied to the electrode through the belt and the suspending means. The on-coming electrode is thus already ignited before the remainder of the previous electrode is withdrawn from the welding region and carried round the bottom guide roller for the belt and up the second limb of the latter together with its holder. During the welding of the second electrode there is ample time afforded for the removing of the remnant of the previous electrode and for the insertion of a new electrode in the idle holder on the traveling belt. Thus with apparatus of this nature the electrode can not be used up entirely, and the wastage, which is very considerable, depreciates the economy of the method. A further, serious drawback is that for a certain length of time the arc passes from both electrodes jointly, to the workpiece, so that during this time the cross-sectional area of electrode used is doubled, while the welding current remains unchanged, in other words the current traversing the normally employed cross-sectional area of electrode is halved. This amount of current is not sufficient to ensure good welding, and in the case of sheathed electrodes the arc is generally extinguished, and the welding seam becomes defective at the part involved.

The present invention provides apparatus which also permits of the continuous welding of electrodes of the type obtained by the simple dipping process, these electrodes being rendered conductive and being rigidly interconnected by being screw-jointed, dove-tail jointed or the like, so that the complete using-up of the electrodes is ensured, and at the same time the electric arc passes always only from one electrode end to the workpiece.

A constructional embodiment of the invention is shown, by way of example, in the accompanying drawings, in which:—

Figs. 1 and 2 show the essential parts of the apparatus according to the invention, with modifications.

Fig. 3 is a plan view of the apparatus shown in Fig. 2.

Figs. 4 to 8 show details of the apparatus (welding head) according to the invention.

Referring to Fig. 1, the pair of rollers I drives an endless belt 2, preferably in dependence on the voltage of the arc or on the welding current. Attached to the belt there are current supplying members 3, 3a, 3b, which also serve to hold and to feed forward the electrode. The welding rods proper (4, 5) are provided at the upper end with an uncovered part, for the purpose of enabling the connection of the current supplying member thereto. The mode of operation of the apparatus is as follows: During the fusing of the electrode rod 4, the current supply and the moving of the rod are effected by the current supply member 3. In the meantime the electrode rod 5 is placed in position end to end on the electrode rod 4, and conductively and rigidly connected thereto by means of screwing, pegging, or the like. Before the current supplying member 3 has reached the lowest position in the apparatus, the next following current supplying member 3a is attached to the upper uncovered part of the electrode 5, whereupon the current supplying member 3 is detached from the rod 4. To the belt 2 there are attached a number of current supplying members 3, 3a, and so on in endless sequence, so that the above-described cycle of procedure is repeated indefinitely.

The uncovered portion provided at the upper end of the electrode rods, for the purpose of enabling an effective current-carrying connection to be made, should involve the omission or removal of as little as possible of the sheathing of the electrode, since this portion of the electrode becomes in its turn likewise welded. This can be accomplished, for example, in the case of thin electrodes by leaving as short a length as possible of the rod uncovered, and in the case of comparatively thick electrodes by the provision of a transverse hole in the electrode rod into which a current-carrying pin can be inserted or plugged. The rollers 1 shown in Fig. 1 can be dispensed with if the rollers 6, which carry the belt 2, be driven, and be provided with means such as teeth or the like enabling them to drive the belt 2. Further, the current supplying members 3, 3a, and so on need not necessarily be fixedly attached to the endless belt but can be made fast to the latter simultaneously with being attached to the electrode rod.

Fig. 2 shows a modified type of feed mechanism for the apparatus according to the present invention, embodying the use of a threaded spindle or helix. In an enclosed tube 8 there is mounted a threaded spindle 9 which is driven, through the bevel wheel pair 10 and the worm gear 11, by the motor 12 which works in dependence on the electric welding arc. The welding electrodes are equipped with pins 14 adapted to engage in the threaded spindle 9. On both sides of the pin 14 there are provided water-cooled current-carrying rails 15 which are of a length corresponding to that of the threaded spindle, and which are pressed against the pin by means of springs. The interconnection of the electrodes 13 can also be effected by off-set overlapping, as shown in Fig. 2, or by similar types of joint. The pin 14, which serves for the feeding forward of the electrode and for the supplying of current thereto, can also be made to serve for the coupling together of the electrodes. This coupling can also be effected by screw-jointing, welding, or otherwise, in which case the pin has merely to perform the functions of transmitting the feed movement and of supplying current to the electrode. With this welding apparatus there can also be employed long electrode rods, of a length which is a multiple of that of the threaded spindle 9. Such electrodes are furnished with a plurality of pins 14 for consecutive engagement in the thread of the conveyor spindle.

The electrode rod 13 is connected to the upper end of the previous rod before the latter disappears into the casing 8. At the lower end of the tube 8 there is an aperture through which the pins 14 can freely pass with the electrode rod, to be fused together with the rod in the welding process.

Fig. 5 shows, on a larger scale, a modified form of the conveyor spindle shown in Fig. 2, adapted to allow for variations or inaccuracies in the spacing of the pins 14. For this purpose the conveyor spindle consists of two parts 16 and 17, the lower part 17 being slidable in an axial direction on the central pin 18 of the upper part 16, and pressed upwards by the spring 19. The key 20 ensures that the two parts of the spindle shall rotate together synchronously. The threading of the spindle 16 is widened or spread at the upper, engaging end, and that by an amount corresponding to the maximum limit of variation in the spacing of the pins 14. In this manner faultless working is obtained even with cheap electrodes manufactured on mass production lines, in which the distance between the engaging pins 14 varies within certain limits. The widened threading at the top of the spindle permits of the engagement of the incoming pin without fail, while the lower pin, which is still in engagement with the normal threading of the conveyor spindle, continues to effect the forward feeding of the electrode. As the upper pin passes into the thread of normal pitch the lower portion 17 of the spindle becomes forced away from the upper portion by the amount by which the actual spacing of the pins 14 deviates from a multiple of the screw pitch. As soon as the lower pin comes clear of the spindle 17 this latter is restored to its original position by the spring 19. It is also possible to employ endless electrodes with the described type of welding head, provided the sheathing permits of the coiling of the wire. Electrodes of this nature are preferably provided with engaging pins spaced to suit the length of the spindle.

It is also possible to employ, for the conveyance of the electrodes, instead of the pins 14, stamped metal plates 21 (see Figs. 6, 7 and 8) which are screwed into position simultaneously with the coupling of the electrodes together, or which are clamped between each pair of screw-jointed electrodes, and which project into engagement with the turns of the screw threading on the conveyor spindle 16. The size of these plates 21 is adapted in each instance to the size of the electrode 13 and its sheathing. The thickness of these plates is comparatively slight, in order to ensure that they can be fused in the welding region without causing any trouble. The current is supplied through one or two conductor rails 22 and 23 arranged on both sides of the electrode for slip contact with the engaging plates. In the drawings, these conductor rails are shown adapted for water cooling. These rails can also be pressed against the engaging and contacting plates by means of springs.

What we claim is:

1. In electric welding apparatus using covered rod-shaped electrodes, means for the rigid and current-conducting interconnection of the said electrodes, spaced current-leading elements conductively and mechanically positively connected to the core of the said electrodes, electric conductors extending parallel to the said electrodes for a distance greater than the clearance between any consecutive two of the said elements, means for securing electrical contact between the said conductors and the said elements, and means for feeding forward the said elements.

2. In electric welding apparatus using covered rod-shaped electrodes, means for the rigid and current-conducting interconnection of the said electrodes, current-leading elements interposed at the points of connection between the said electrodes and conductively and positively connected to the core of the said electrodes, electric conductors extending parallel to the said electrodes for a distance greater than the clearance between any consecutive two of the said elements, means for securing electrical contact between the said conductors and the said elements, and means for feeding forward the said elements.

3. In electric welding apparatus using covered rod-shaped electrodes, means for the rigid and current-conducting interconnection of the said electrodes, current-leading elements in the form of small thin plates interposed at the points of connection between the said electrodes and conductively and positively connected to the core of the said electrodes, electric conductors extending parallel to the said electrodes for a distance greater than the clearance between any consecutive two of the said elements, means for securing electrical contact between the said conductors and the said elements, and means for feeding forward the said elements.

4. In electric welding apparatus using covered rod-shaped electrodes, means for the rigid and current-conducting interconnection of the said electrodes, current-leading elements of a nature to melt away together with the electrode in the welding arc, the said elements being in electrically conducting and constrained mechanical connection with the core of the said electrodes, electric conductors extending parallel to the said electrodes for a distance greater than the clearance between any consecutive two of the said elements, means for securing electrical contact between the said conductors and the said elements, and means for feeding forward the said elements.

5. In electric welding apparatus using covered rod-shaped electrodes, means for the rigid and current-conducting interconnection of the said electrodes, current-leading elements in electrically conducting and constrained mechanical connection with the core of the said electrodes, water-cooled electric conductors extending parallel to the said electrodes for a distance greater than the clearance between any consecutive two of the said elements, means for securing electrical contact between the said conductors and the said elements, and means for feeding forward the said elements.

6. In electric welding apparatus using covered rod-shaped electrodes, means for the rigid and current-conducting interconnection of the said electrodes, current-leading elements in electrically conducting and constrained mechanical connection with the core of the said electrodes, electric conductors extending parallel to the said electrodes for a distance greater than the clearance between any consecutive two of the said elements, means for securing electrical contact between the said conductors and the said elements, and means consisting of a rotary spindle screw threaded throughout its length and adapted to be engaged by the said elements for the feeding forward of the said elements.

7. In electric welding apparatus using covered rod-shaped electrodes, means for the rigid and current-conducting interconnection of the said electrodes, current-leading elements in electrically conducting and constrained mechanical connection with the core of the said electrodes, electric conductors extending parallel to the said electrodes for a distance greater than the clearance between any consecutive two of the said elements, means for securing electrical contact between the said conductors and the said elements, and means consisting of a rotary spindle comprising a plurality of parts and screw threaded throughout its length and adapted to be engaged by the said elements for the feeding forward of the said elements, the said parts being axially slidable relatively to each other.

8. In electric welding apparatus using covered rod-shaped electrodes, means for the rigid and current-conducting interconnection of the said electrodes, current-leading elements in electrically conducting and constrained mechanical connection with the core of the said electrodes, electric conductors extending parallel to the said electrodes for a distance greater than the clearance between any consecutive two of the said elements, means for securing electrical contact between the said conductors and the said elements, and means consisting of a multi-part rotary spindle screw threaded throughout its length and adapted to be engaged by the said elements for the feeding forward of the said elements, the said parts being axially slidable relatively to each other, and the screw threading on the upper of the said parts being widened for the readier engagement of the said elements.

OTTO WEIGNER.
WILLIBALD SENFT.